Feb. 23, 1954   B. F. REYNOLDS   2,670,015
WIRE SPLICER AND SCRAPER
Filed March 2, 1951
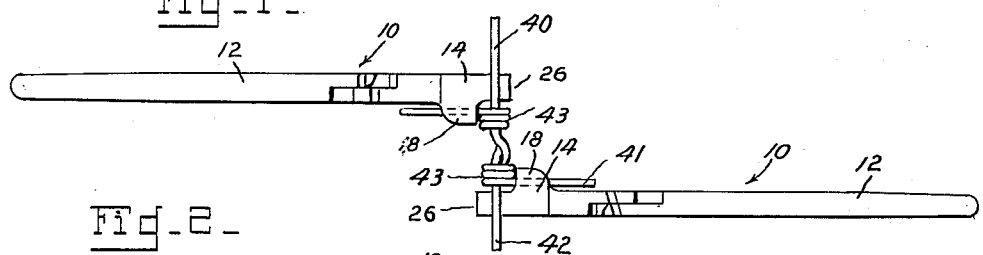
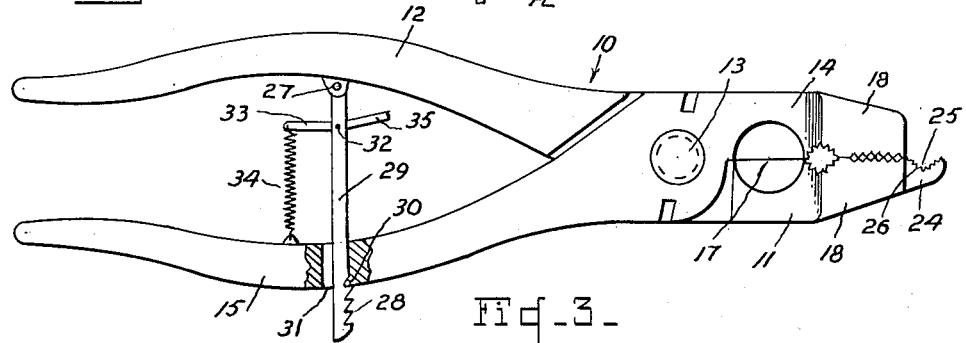
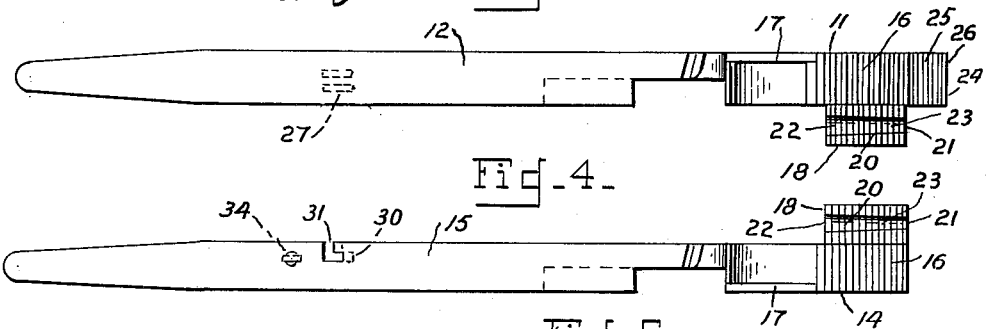
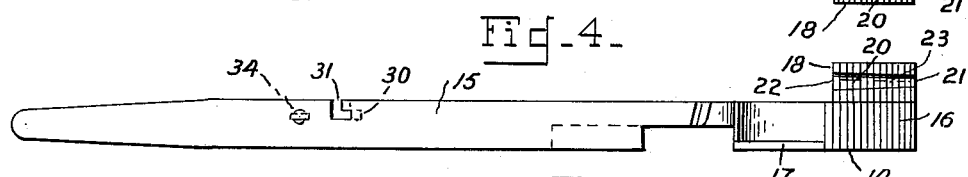
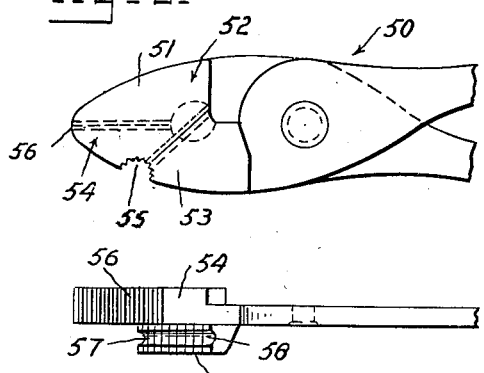
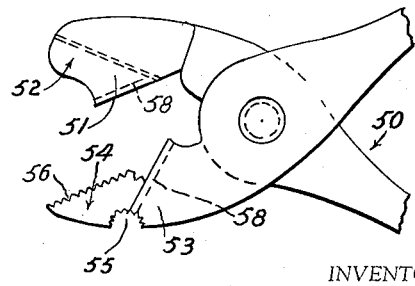
INVENTOR:
Boyd F. Reynolds,
BY *Gustave Miller*
ATTORNEY Patented Feb. 23, 1954

2,670,015

UNITED STATES PATENT OFFICE 2,670,015

WIRE SPLICER AND SCRAPER

Boyd F. Reynolds, Twin Falls, Idaho

Application March 2, 1951, Serial No. 213,622

2 Claims. (Cl. 140—121)

This invention relates to a wire splicer and scraper and has for an object to provide an improved tool in the nature of pliers, particularly designed for use by electric wiremen.

A further object of this invention is to provide a wire splicer and scraper consisting primarily of two pairs of pliers to be used in one operation for removing the corrosion or thin insulation from the ends of two pieces of wire and for simultaneously splicing such two pieces of wire together with any desired tightness of splice while scraping the wires during the splicing operation.

A further object of this invention is to provide a tool to be used for making a complete splice in one operation, which also scrapes both splice ends and both main lines simultaneously, as the splice is being made.

Still a further object of this invention is to provide a wire splicer and scraper whereby any size wire may be spliced to any desired tightness with a tool splice.

Still a further object of this invention is to provide a means for adjusting each tool so as to provide a desired and identical desired tightness to the splice.

Yet a further object of this invention is to provide a wire splicer and scraper which may be set in any desired adjustment according to the size of the wire and to the tightness of splice that is desired and which will maintain such adjustment during the splicing operation.

Still a further object of this invention is to improve a conventional wireman's pair of pliers so that it may be used for its conventional purposes and in addition may be used for the purpose of this invention for splicing and scraping insulated wires of any desired size to any desired tightness of splice.

Yet a further object of this invention is to provide a linesman's pliers with laterally extending side jaws having file-like teeth extending transversely across a groove of gradually increasing diameter from the front to the back, and having a front jaw extending forwardly on one plier with a groove extending across the plier, which groove is likewise provided with file-like teeth for scraping the wire.

With the foregoing and other objects in view, this invention comprises the combination, construction and arrangement of parts hereinafter set forth, claimed and disclosed in the accompanying drawings, wherein:

Fig. 1 is a top plan view showing two pairs of pliers of this invention in the process of making a splice;

Fig. 2 is a side plan view of one of the identical pairs of pliers of this invention;

Fig. 3 is a top plan view of one jaw and handle member of the pliers;

Fig. 4 is a top plan view of the other jaw and handle member of the pliers;

Fig. 5 is a side plan view of a modified form of this invention;

Fig. 6 shows the jaws of Fig. 5 in open position, and

Fig. 7 is a top plan view of the lower jaw of Fig. 6.

There is shown at 10 in Fig. 2 a pair of wiremen's or linemen's pliers modified to include this invention. As shown in Fig. 1, two pairs of pliers 10 are utilized in the operation of the invention, but inasmuch as both pairs of pliers 10 are identical in construction and operation, it will only be necessary to describe the details of construction of one pair of pliers 10. The pliers 10 consists of an under jaw 11 having its upper handle 12 pivoted at 13 through an upper jaw 14 having its integral lower handle 15, both jaws 11 and 14 are transversely serrated at 16 as usual and each is provided with its complementary longitudinally extending cutting blade 17.

Integrally secured along the side of each jaw 11 and 14 on the opposite side from the cutting blade 17 is a side jaw 18 in the center of which is provided a longitudinally extending semi-circular groove 20 which enlarges from the front end 21 toward the rear end 22 and is provided with circumferentially extending file-like teeth 23. As will be apparent when the jaws 11 and 14 are in fully closed position shown in Fig. 2, the side jaws 18 complement each other and are similarly in contact with each other whereby the grooves 20 together provide a longitudinally extending opening tapering from their front ends 22 toward their rear ends 21. Extending integrally and forwardly from one, not from the other, of the jaws, as from the under jaw 11, is a front or extension finger 24 provided with a semi-circular groove 25 extending transversely of the jaw, the groove 25 also being provided with file-like teeth 26 which in this case extend longitudinally of the groove.

The means for holding the jaws 11 and 14 at any desired and set angle to each other includes a locking bar 29 pivoted at 27 to the under side, or rather the inner side, of the handle 12 of the under jaw 11. This locking bar 29 is provided with a plurality of locking teeth 28, any one of which may cooperate with a sharp edge 30 provided on the inside of a bayonet joint slot 31 extending through the other jaw handle 12. The pivot at 27 is sufficiently loose so that the locking bar 29 may be moved away from the sharp edge 30 and out of operation through the slot 31. Secured to the locking bar 29 at 32 is a cross bar 33. Biased between the outer end of cross bar 33 and the inner side of handle 15 is a tension coil spring 34, tending to pivot cross bar 33 and locking bar 29 in a counter-clockwise direction as viewed in Fig. 2, thus holding the teeth 28 against the sharp edge 30, when the locking bar 29 is in position in bayonet slot 31. As long as the locking bar 29 is in position in bayonet slot 31, the jaws 11 and 14 will be held at any set position relative to each other and such position may be adjusted by merely pressing the end of locking bar 29 away from the sharp edge 30, adjusting the handles 12 and 15 relative to each other and then letting the spring 34 engage one of the teeth 28 against the sharp edge 30.

When it is desirable to use the tool as a conventional pair of pliers, or it is desirable that the two jaws be free to pivot relative to each other, the locking bar 29 is disengaged from the bayonet slot 31, whereupon the projecting end 35 of cross bar 33 will abut against the inner side of handle 12 under the action of spring 34 pivoting the locking bar 29 about its pivot 27, thus providing a neutral rest holding the locking bar 29 out of the way while so disengaged from bayonet slot 31. In operation, the wire 40 to be spliced is grasped at the desired distance from its end 41 between the side jaws 18 of one pair of pliers and bent at a right angle away from its extending finger 24 and outside groove 25, the locking bar 29 being held in disengaged position from its bayonet slot 31 by the thumb or by allowing its neutral rest 35 to come into operation. The other wire 42 is similarly grasped by the other splicer and scraper which is held in upside down position, along side the first pair of pliers, thus placing the side jaws of both pair of splicers on the inner side or next to each other. The groove 25 on one pair of splicers will be up and the groove 25 on the other will be down. These outside grooves will then be engaged on opposite wires and will be rotated in opposite directions. As seen in Fig. 1, both pairs of pliers are in the process of being rotated downwardly about the wires 40 and 42 and as such rotation is continued a perfect splice of the desired length is formed at 43 as shown. Before the pliers are rotated relative to each other, the locking bar 29 has one of its teeth 28 engaged against the sharp edge 30 in slot 31 according to the size of the wire and the tightness of the splice that is desired. As the wires 40 and 42 pass through the apertures provided between the side jaws, any insulation thereon is scraped off by the file-like teeth 20 extending circumferentially around the wire, and the longitudinally extending teeth 26 in the groove 25 on the extending finger 24 scrapes or cleans both main lines 40 and 42 simultaneously as it is being spliced, thereby providing a splice having thoroughly cleaned contact between the engaging wires, thus making for good electrical connection therebetween. Due to the tapering effect of the aperture provided by the grooves 20 in side jaws 18 and the adjustment provided by the locking bar 29, any size wire may be spliced to any desired tightness with a true splice.

In Figs. 5, 6 and 7, the principles of this invention are shown as applied in a slightly different manner to a somewhat different type of pliers. In this form, the pliers 50 are provided with complementary side jaws 51 on one plier jaw 52 and 53 on the other plier jaw 54. As will be observed, the side jaws 51 and 53, complementary to each other, extend at an angle to the longitudinal axis of the pliers 50 and not parallel thereto as in the first described form. An outside or transverse groove 55 provided with longitudinally extending teeth 56 is formed integrally through the outer surface of the one jaw 54 at a point adjacent the end of grooves 58 provided in the side jaws 51 and 53. The grooves 58 are each provided with file-like teeth 57 similar in function and structure to the file-like teeth 20 in the other side jaws.

The handles of the pliers 50 may be provided with similar adjusting means such as shown in Fig. 2 including the locking bar 29 and its associated parts. The operation for this form of pliers is so similar to the operation of the first described form that it need not be repeated.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

1. A wire twisting implement arranged to be used in pairs, said implement comprising a pair of crossed levers forming handles at one end and jaws at the opposite end, said levers being pivoted together, one of said jaws having a transverse groove at its outer end, file-like teeth extending longitudinally of said groove, both of said jaws having complementary grooves extending longitudinally thereof and file-like teeth extending transversely of said longitudinal grooves, said longitudinally extending grooves each tapering from its handle end inwardly toward its outer end, and means for adjustably holding said jaws in a desired relation to each other, said adjustable holding means comprising a locking bar having one end pivoted on the inner side of one of said crossed levers and having its other end serrated and arranged to extend through a bayonet slot in the other of said crossed levers, said bayonet slot having a sharpened tooth on the side extending toward its jaw and spring means normally urging said serrated locking bar into said sharpened edge of said bayonet slot.

2. A wire twisting implement arranged to be used in pairs, said implement comprising a pair of crossed levers forming handles at one end and jaws at the opposite end, said levers being pivoted together, one of said jaws having a transverse groove at its outer end, file-like teeth extending longitudinally of said groove, both of said jaws having complementary grooves extending longitudinally thereof and file-like teeth extending transversely of said longitudinal grooves, said longitudinally extending grooves each tapering from its handle end inwardly toward its outer end, and means for adjustably holding said jaws in a desired relation to each other, said adjustable holding means comprising a locking bar having one end pivoted on the inner side of one of said crossed levers and having its other end serrated and arranged to extend through a bayonet slot in the other of said crossed levers, said bayonet slot having a sharpened tooth on the side extending toward its jaw and spring means normally urging said serrated locking bar into said sharpened edge of said bayonet slot, said spring means comprising a cross bar on said locking bar, a spring biased between the outer handle side of said cross bar and the inner side of said handle having the bayonet slot, the other end of said cross bar being arranged to abut the inner side of its handle when said locking bar is free of said bayonet slot.

BOYD F. REYNOLDS.

References Cited in the file of this patent

UNITED STATES PATENTS

| Number | Name | Date |
|---|---|---|
| 207,449 | Sellers | Aug. 27, 1878 |
| 396,819 | Hubbell | Jan. 29, 1889 |
| 445,972 | Caldwell | Feb. 10, 1891 |
| 513,742 | Trout | Jan. 30, 1894 |
| 539,335 | Baughman | May 14, 1895 |
| 563,684 | Peck | July 7, 1896 |
| 601,929 | Beatty | Apr. 5, 1898 |
| 652,696 | Smith | June 26, 1900 |
| 669,351 | Schindel | Mar. 5, 1901 |
| 777,021 | Hansen | Dec. 6, 1904 |
| 1,032,909 | Jackman | July 16, 1912 |
| 1,326,766 | Moore | Dec. 30, 1919 |
| 1,492,984 | Humphreys | May 6, 1924 |
| 1,566,297 | Williams | Dec. 22, 1925 |
| 2,262,411 | Smith | Nov. 11, 1941 |